(12) United States Patent
Uchino et al.

(10) Patent No.: US 7,110,758 B2
(45) Date of Patent: Sep. 19, 2006

(54) INVERTER MAINTENANCE SYSTEM AND INVERTER

(75) Inventors: Yoshihiro Uchino, Funabashi (JP); Masataka Sasaki, Hitachi (JP); Masahiro Sano, Chiba (JP)

(73) Assignee: Hitachi, Ltd., Tokyo (JP)

( * ) Notice: Subject to any disclaimer, the term of this patent is extended or adjusted under 35 U.S.C. 154(b) by 638 days.

(21) Appl. No.: 09/941,704

(22) Filed: Aug. 30, 2001

(65) Prior Publication Data

US 2002/0132618 A1 Sep. 19, 2002

(30) Foreign Application Priority Data

Mar. 14, 2001 (JP) ............................. 2001-072649

(51) Int. Cl.
*H04Q 7/20* (2006.01)
*H04M 11/08* (2006.01)
(52) U.S. Cl. ............................. 455/426.2; 379/102.04
(58) Field of Classification Search .................. 701/29, 701/24, 28; 363/21, 98; 455/414, 1
See application file for complete search history.

(56) References Cited

U.S. PATENT DOCUMENTS 5,931,877 A 8/1999 Smith et al.
5,961,561 A 10/1999 Wakefield, II

FOREIGN PATENT DOCUMENTS

| DE | 19650569 | 6/1998 |
| EP | 0822473 | 2/1998 |
| EP | 1122876 | * 11/2000 |

OTHER PUBLICATIONS

XP-002267132 SJ/L100-PB Product Manual "ProfiBus-DP Module for the Hitachi SJ100/L100 Series HB-SJL100PB-8/00-e" Revision 1.01 HMS Fieldbus Systems AB.

* cited by examiner

*Primary Examiner*—Gerald Gauthier
(74) *Attorney, Agent, or Firm*—Antonelli, Terry, Stout and Kraus, LLP.

(57) ABSTRACT

In an inverter maintenance system, while an inverter of a user, a user support server of maker, and also, a portable telephone capable of accessing to a Web server are employed, such information required to maintain/manage the inverter is transferred/received by way of the portable telephone. Thus, various sorts of requests can be accepted by both the user support server and the Web server.

22 Claims, 16 Drawing Sheets

INVERTER MAINTENANCE SYSTEM AND INVERTER

BACKGROUND OF THE INVENTION

Field of the Invention

The present invention is related to a customer service system of an electric appliance. More specifically, the present invention is directed to an inverter maintenance system for supporting both maintenance and conduction of inverters, and also directed to an inverter for this inverter maintenance system.

Very recently, inverters are considerably popularized, and these inverters are used in various fields. As a consequence, user-friendly supports are required for wide ranges as to maintenance of these inverters.

On the other hand, in such a case, in accordance with the conventional support system, at a time instant when operation of an inverter is stopped and therefore a system of a user (customer) is brought into a malfunction state, the user usually makes a contact via either a telephone or a facsimile to a user support center (acceptance) which is previously notified from a maker (manufacturer, and product supplier) of the inverter. Then, an inverter recovery work may be carried out in such a manner that a contact is made from the user support center.

At this time, in such a case that the recovery work of this inverter cannot be carried and therefore a substitute product is required, the user newly considers a necessary machine sort/a necessary rated value of the substitute inverter by calling an agent shop, or the like.

On the other hand, as to such a user who tries to newly conduct an inverter, only such a business prospective request may be contacted from the user support center to a business branch/agent shop.

The above-described conventional inverter maintenance system owns such a problem that this conventional system cannot sufficiently and rapidly accept various sorts of contacts made from the users, but also cannot solve these user problems in good sense.

First, in the case of the conventional inverter maintenance system, the contact communications between the user support center and the user are carried out by way of the telephone, or the facsimile.

As a result, in such a case that a failure happens to occur in an inverter, a user notifies a condition of this troubled inverter to the user support center in such a manner that, for example, the user telephones to the user support center in a verbal manner. However, since this user support center is operated by man power, this user request can be accepted only during business hours.

Also, even when a substitute product is required, the user newly must notify both machine sort/rated value of such a substitute inverter to the agent shop.

On the other hand, even in such a case that such a contact communication is given to the user support center as to a business request for newly conducting an inverter, in accordance with the conventional inverter maintenance system, this user support center asks for usage of the user to give an advise of selecting a proper machine sort, and then, merely introduces a business branch, or an agent shop.

Furthermore, while such a failure occurrence example, a trouble solving example, and also a business request example are useful as information about a manufacture history. However, in the conventional inverter maintenance system, these examples are stored in a server and the like in a time sequential manner, and then are merely processed as temporal information by the user support center. Thus, these examples are not effectively utilized for user support purposes.

As a consequence, there is a problem that the conventional inverter maintenance system cannot quickly and sufficiently accept the user requests, but also cannot solve the user problems.

SUMMARY OF THE INVENTION

An object of the present invention is to provide such an inverter maintenance system capable of quickly and sufficiently achieving maintenance of an inverter.

Concretely speaking, first of all, while a user uses an inverter, in such a case that operation of the inverter is stopped due to some reason and therefore, a system of the user is brought into malfunction condition, such a method capable of recovering this troubled inverter within the shortest time duration is provided.

Next, as a second object, it is possible to provide an method capable of immediately supplying such an inverter into which a predetermined parameter has previously been set to a user at timing when a substitute product is needed.

Furthermore, as a third object, it is possible to provide such a method that while both optimum machine sort/rated value of an inverter are proposed to a user who newly conducts an inverter, such an inverter into which a necessary parameter has previously been set can be supplied to this user.

Similarly, another object of the present invention is to provide an inverter, the parameter of which can be set by using a portable telephone.

The above-described objects may be achieved by such an inverter maintenance system characterized in that portable telephones having interfaces are employed in both an inverter of a user and a user support server of a maker; the inverter maintenance system is comprised of: a step in which when an abnormal condition of the inverter happens to occur, abnormal information of the inverter, which is inputted into the portable telephone, is transferred to the user support server; and a step in which the user support server analyzes the abnormal information so as to form trouble shooting information, and then, transfers the formed trouble shooting information to the portable telephone; and the abnormal condition of the inverter can be solved based upon the trouble shooting information transferred to the portable telephone.

Similarly, the above-described objects may be achieved by such an inverter maintenance system characterized by that a portable telephone having an interface is employed in a user support server of a maker; the inverter maintenance system is comprised of: a step in which inverter purchase request information entered into the portable telephone is transferred to the user support server; and a step in which the user support server analyzes the inverter purchase request information so as to form inverter recommendable machine sort information, and transfers the formed inverter recommendable machine sort information to the portable telephone so as to prompt an input of inverter machine sort determination information; and the inverter maintenance system can accept an inverter purchase request made by the user based upon the inverter machine sort determination information.

At this time, the interface of the portable telephone is given by a program used to connect the inverter with the portable telephone. Furthermore, in this case, the program is downloaded from a Web site of a maker to the portable telephone.

Also, at this time, into the inverter, a parameter is entered from the portable telephone by manipulating a key thereof. Otherwise, a program which is used to enter the parameter from the portable telephone into the inverter is downloaded from a Web site of a maker to the portable telephone.

Moreover, at this time, the inverter maintenance system is comprised of a database into which when internal information of the inverter is received from the user support server, an acceptance ID is applied to a content at a time instant when the internal information is received, and then the acceptance ID-applied content is stored.

In this case, in accordance with a certain embodiment mode, the present invention is arranged by a user support server comprised of an inverter having an interface with a portable telephone, a portable telephone into which a connection program with respect to the inverter has been written, and a server for opening a Web site by which a program used to connect the inverter with the portable telephone is provided to a user, and also a database.

Then, since such inverter information is identified with both manufacture historical information and trouble shooting information saved on the database, and this inverter information is acquired from the inverter and transmitted from this inverter by connecting the inverter to the portable telephone by the user, it is possible to provide a recovery method of the inverter to the user. The service fee may be charged to the user, and the acceptance information is notified to the agent shop. Then, such a substitute product can be quickly provided to the user, while the same parameter as that of such an inverter which has been used until malfunction occurs is previously set into this substitute product.

Similarly, the above-explained objects may be achieved by such an inverter operated by a parameter set in a control apparatus, in which the parameter is constituted to be set by manipulating a key of a portable telephone.

In this case, when the parameter is set by the portable telephone, the parameter is displayed on a display screen of the portable telephone.

BRIEF DESCRIPTION OF THE DRAWINGS

For a better understanding of the present invention, reference is made of a detailed description in conjunction with the accompanying drawings, in which.

DETAILED DESCRIPTION OF THE EMBODIMENTS

Figure 1:
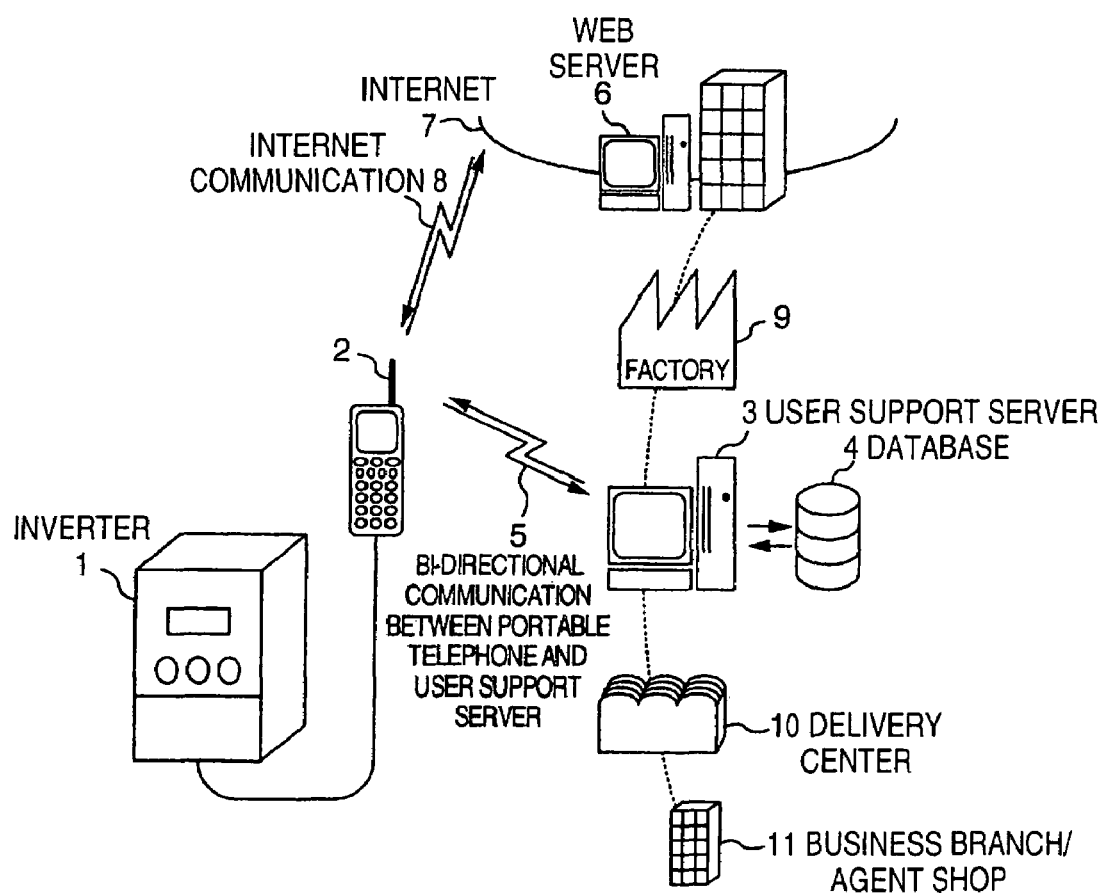
FIG. 1 is a schematic block diagram for indicating an example of a system to which an inverter maintenance system according to an embodiment mode of the present invention is applied.

Subsequently, a description will now be made of an inverter maintenance system according to the present invention based upon embodiment modes shown in the drawings.

FIG. 1 is a block structural diagram for representing various sorts of electronic appliances and facilities, according to an embodiment mode of the present invention. FIG. 2 to FIG. 7 are flow charts for realizing services. It should be noted that the present invention is not limited to these embodiment modes.

First, a first embodiment mode of the present invention is explained. This first embodiment mode is related to such a service directed to a user, the operations of which cannot be carried out, because operation of an inverter is stopped due to a certain reason. At this time, in FIG. 1, the following assumption is made. That is, while an inverter 1 is separated far from a base station (not shown) of a portable telephone, or is shielded by a certain electromagnetic barrier, this inverter 1 is installed at such a place that a telephone communication cannot be established by using the portable telephone.

Thus, the user first takes a portable telephone 2 in his hand (namely, user whose operations could not carried out, since his inverter is stopped), and then this user goes to such a place where a telephone communication can be established via a base station. The user is connected via the Internet 7 to a Web site opened by a Web server 6 of an inverter maker (manufacturer) by way of an Internet communication 8 through a portable telephone line. As a result, as an initial condition, this portable telephone 2 is provided with an Internet connection function.

Figure 8:
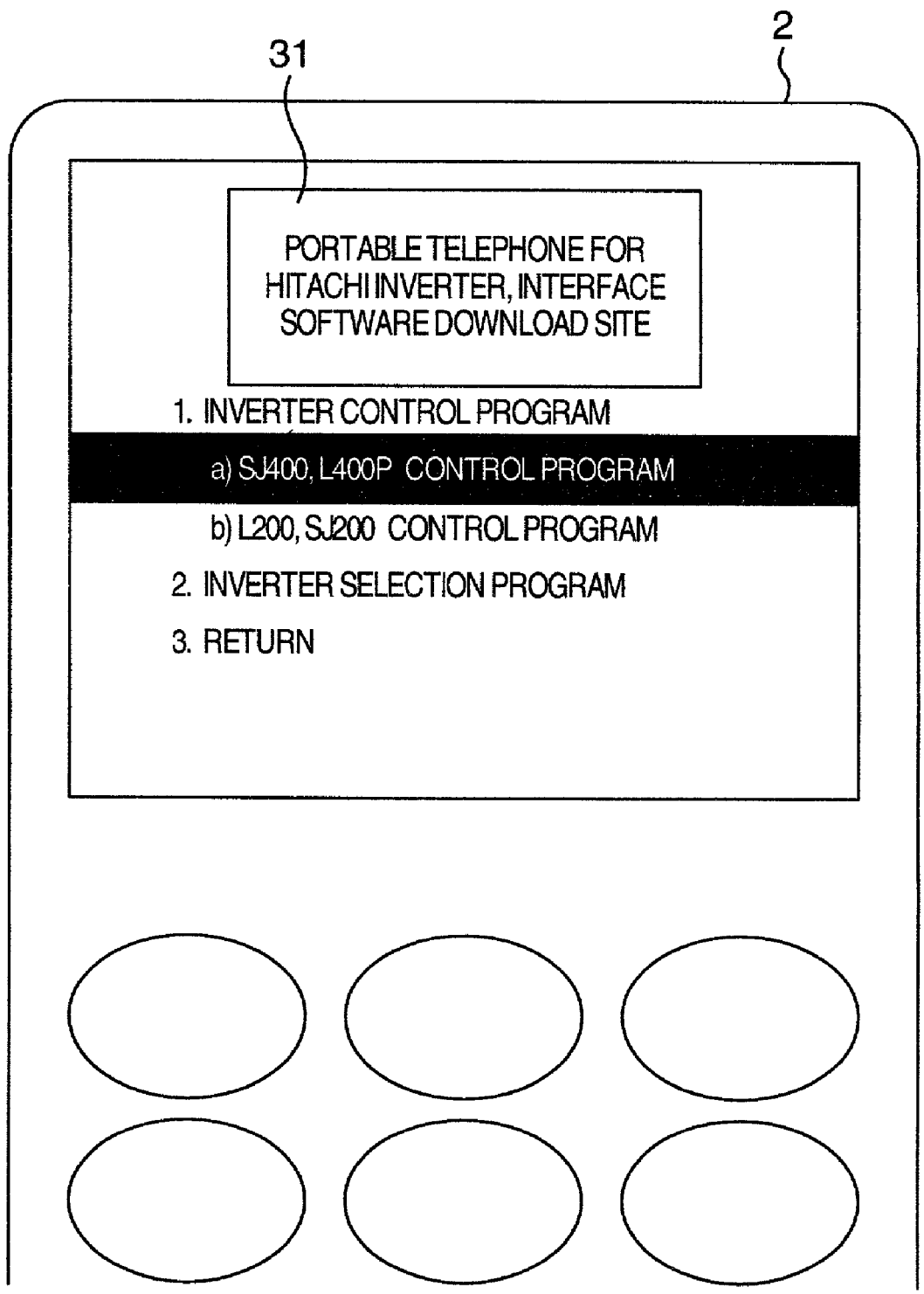
FIG. 8 is an explanatory diagram for explaining a display screen used for a program download operation in the system according to one embodiment mode of the present invention.

As a result, in this case, as represented in FIG. 8, a menu screen 31 used to download a portable telephone connection program is displayed on the portable telephone 2 which is connected to the Web site. Accordingly, the user selects this menu to download an inverter connection program from the Web server 6 to the portable telephone 2. It is so assumed that the program is described by employing, for example, such a language as Java, and the portable telephone is equipped with a JavaScript execution function similar to an "i-Appli (trade name)."

At this time, the format of the program is described by using such a language having no machine-sort-dependency, and may be executed on the portable telephone 2. As a result, as an initial condition, the portable telephone 2 is provided with a function capable of downloading this program.

When the download of this program is accomplished, the user once disconnects the connection established between the portable telephone 2 and the Web site of the inverter maker, and the downloaded program is executed on the portable telephone 2.

Figure 9:
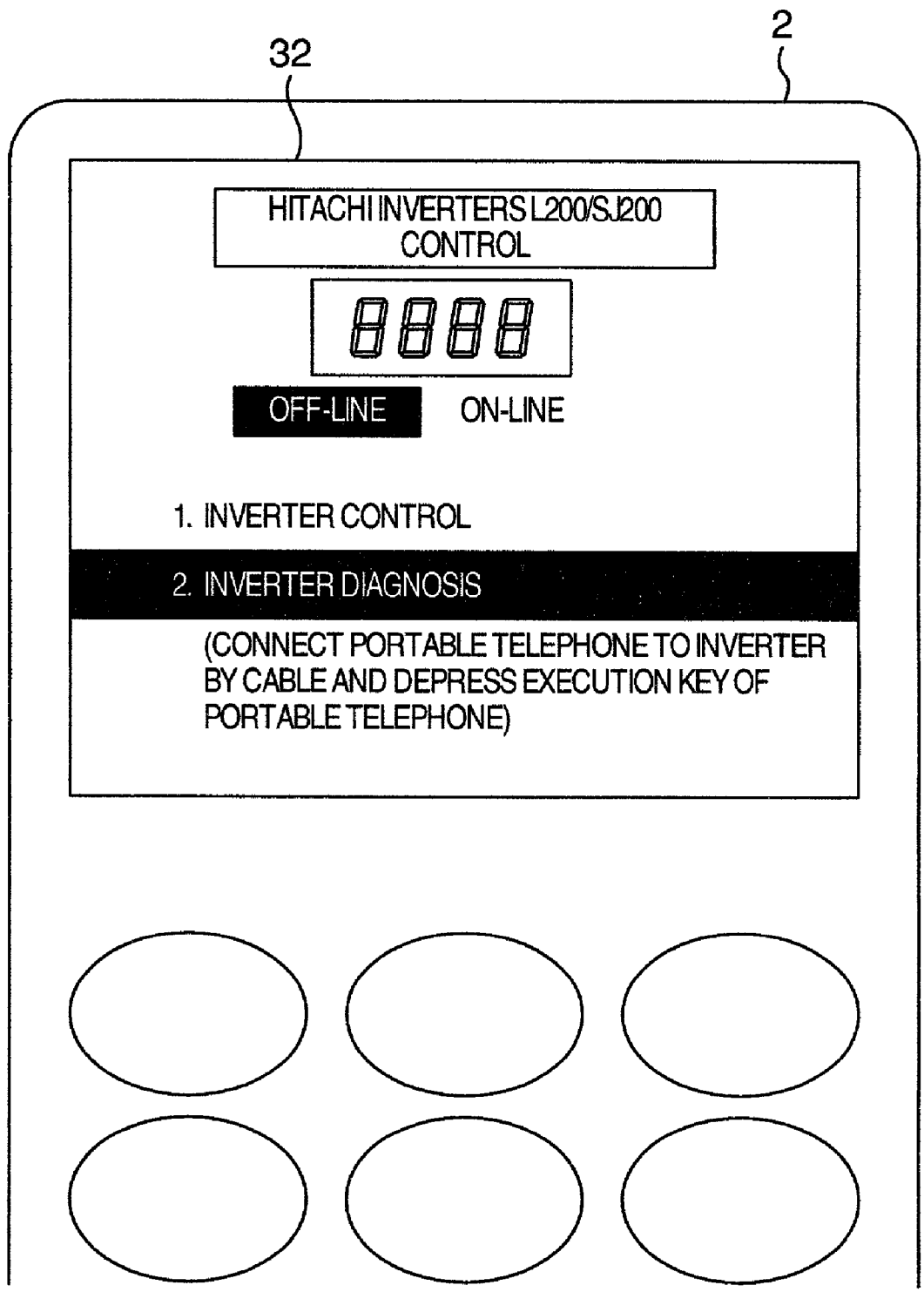
FIG. 9 is an explanatory diagram for explaining a display screen obtained when user information identification is accomplished while an inverter control program is executed in the system according to one embodiment mode of the present invention.

At this time, as indicated in FIG. 9, a screen 32 when the user information identification is completed in the case that an inverter control program is executed is displayed on the portable telephone 2 as a menu containing an inverter diagnosis. Then, such a message is displayed which prompts the user to connect the inverter 1 to the portable telephone 2 by using a cable.

Figure 2:
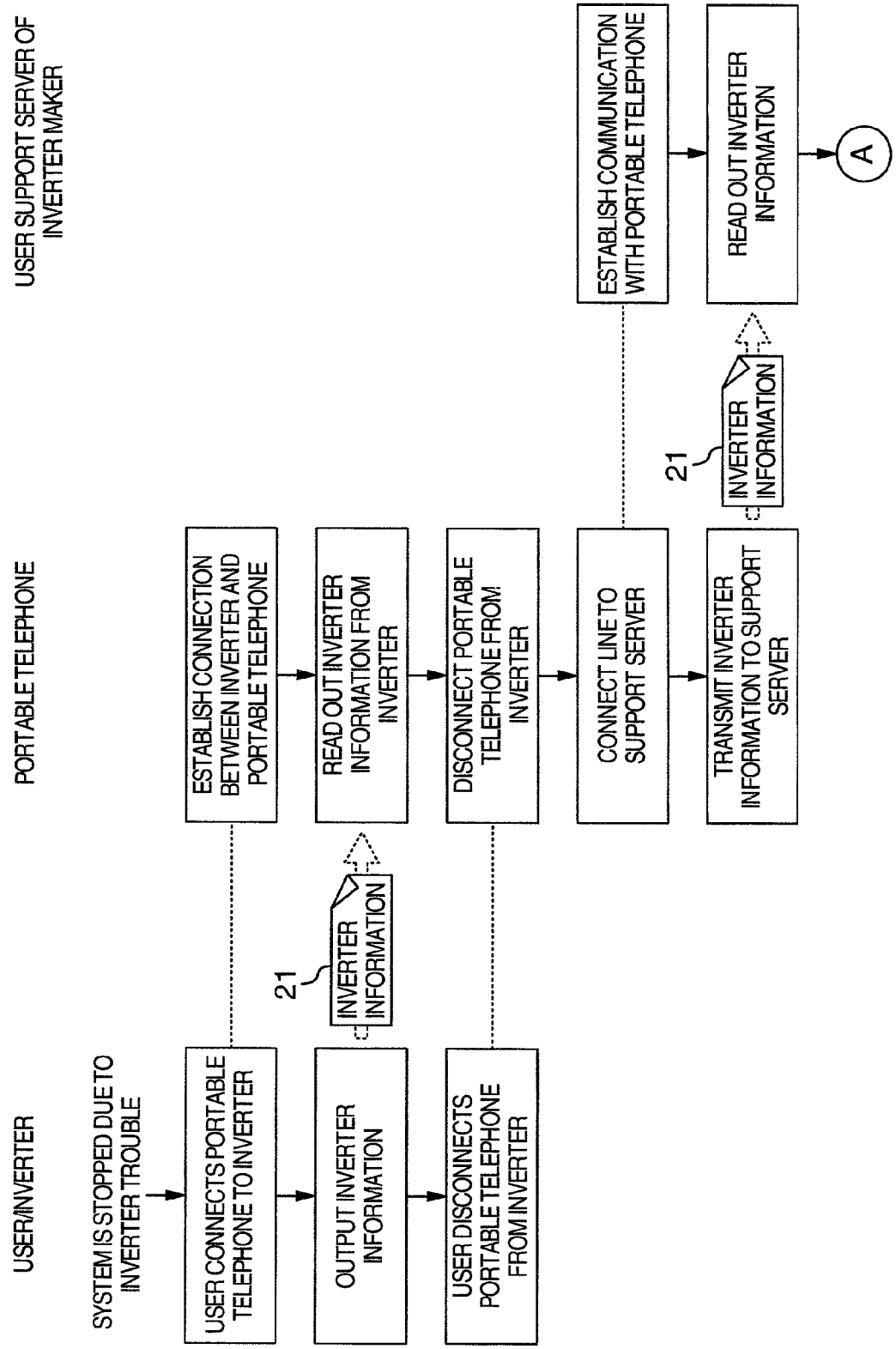
FIG. 2 is a first flow chart for explaining a process operation of the system according to one embodiment mode of the present invention.

Then, while the user takes the portable telephone 2, the user goes to a place where the inverter 1 is installed, and then, connects the portable telephone 2 to the inverter 1 in which a trouble happens to occur (see FIG. 2).

Then, when the user selects the diagnosis of the inverter from the menu displayed on the portable telephone 2, the portable telephone 2 reads inverter information 21 from the inverter 1.

Figure 10:
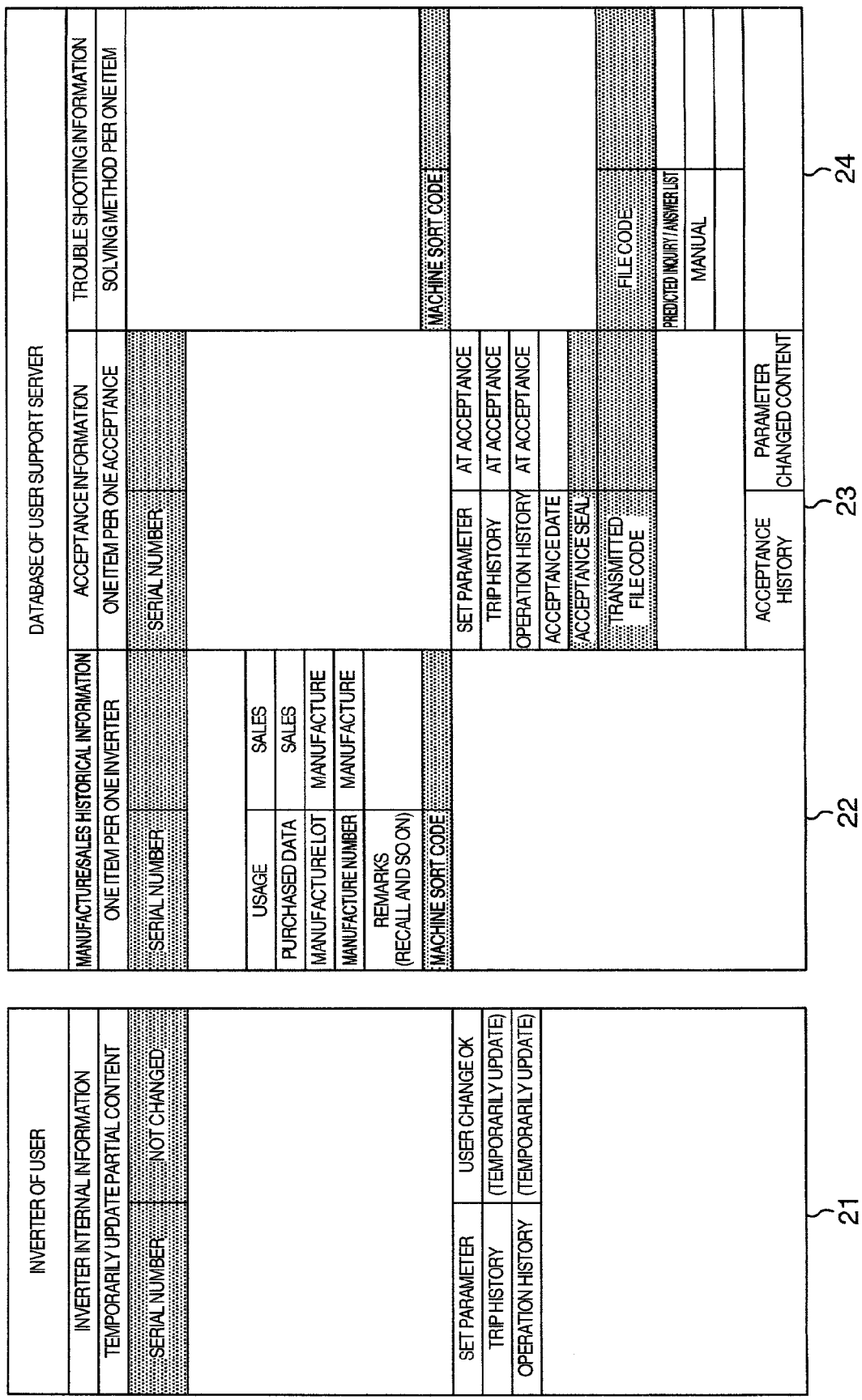
FIG. 10 is an explanatory diagram for explaining various sorts of information in the system according to one embodiment mode of the present invention.

At this time, structural elements of data which are treated in a flow chart are indicated in FIG. 10. In this drawing, the inverter information 21 is constituted by a serial number, a setting parameter, a trip history, an operation history, and the like.

Figure 11A:
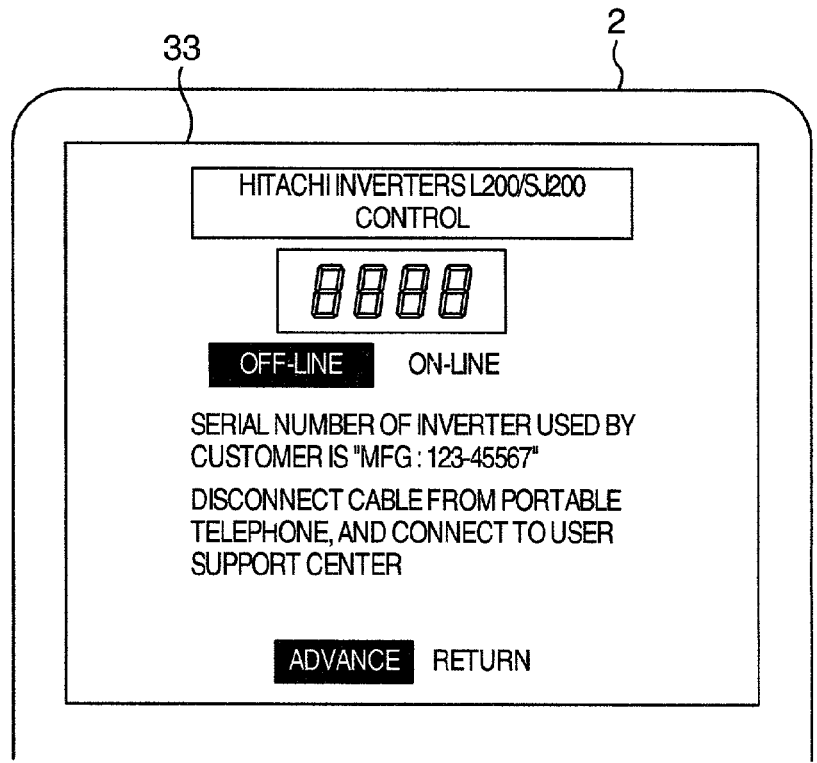
FIG. 11A and FIG. 11B are explanatory diagrams for explaining a display screen obtained when inverter information is read in the system according to one embodiment mode of the present invention.

When the reading operation of the inverter information 21 is accomplished in the above-described manner, a display screen 33 of a failure recovery produce (1) indicated in FIG. 11A is represented on the display screen of the portable telephone 2.

Thus, the user once disconnects the portable telephone 2 from the inverter 1 in accordance with a message of this display screen 33. Then, the user goes to a place where the portable telephone 3 can be communicated with the base station, while taking the portable telephone 2 in his hand, and accesses to a user support server 3 of the inverter maker (see FIG. 2). As a result, the portable telephone 2 transmits the inverter information 21 read out from the inverter 1 to the user support server 3 (FIG. 2).

In this time period defined after the program has been downloaded until the parameter transmission work is carried out, the portable telephone 2 is operated under no telephone communicatable condition, so that no telephone charge is made.

Figure 3:
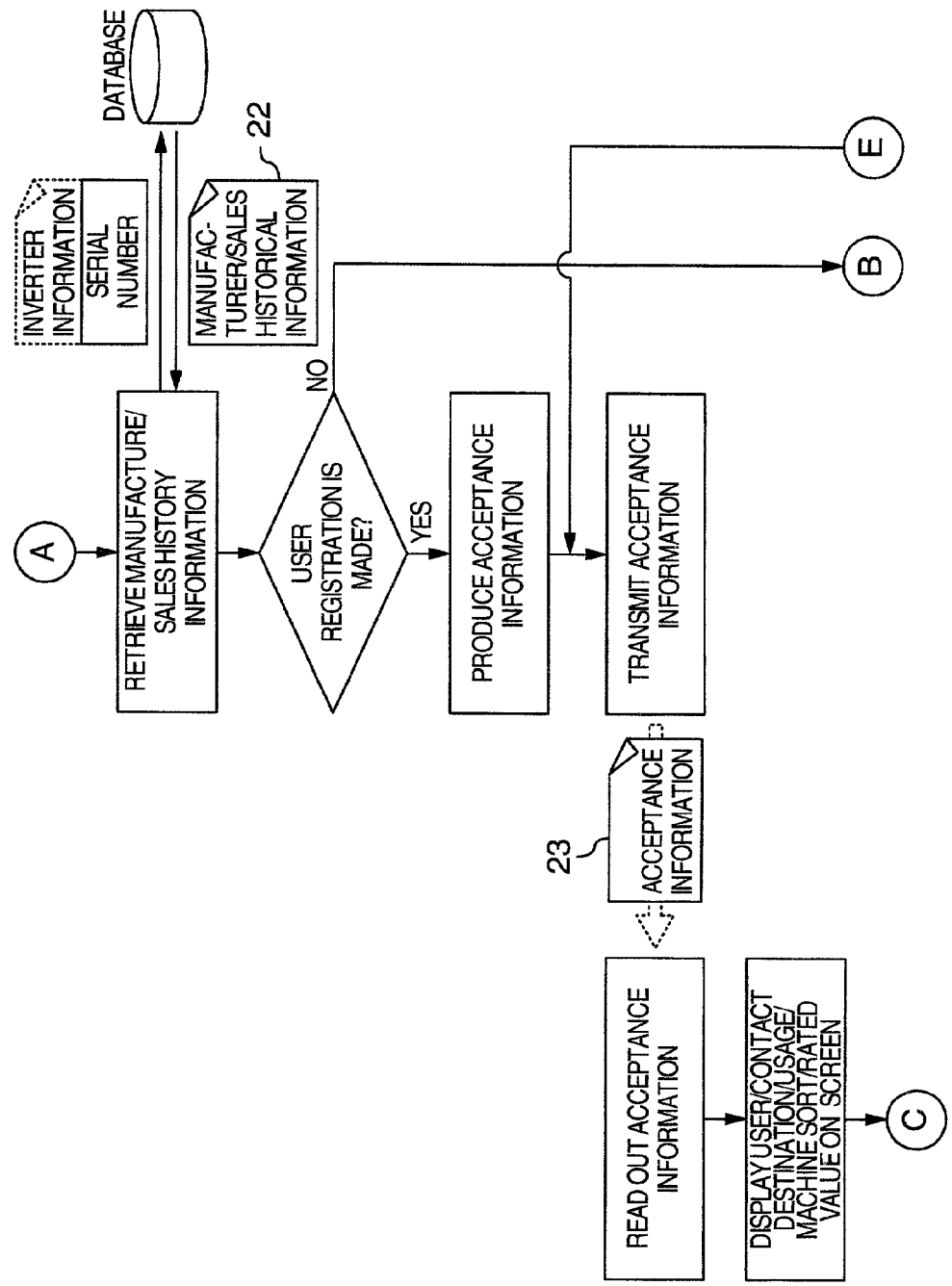
FIG. 3 is a second flow chart for explaining a process operation of the system according to one embodiment mode of the present invention.

The user support server 3 retrieves manufacture/sales historical information 22 contained in a database 4, while the serial number contained in the inverter information 21 which is transmitted from the portable telephone 2 is employed as a key (see FIG. 3).

As shown in the above-described FIG. 10, this manufacture/sales historical information 22 is constituted by serial numbers, manufacturing lots, manufacturing lot numbers, machine sort codes, usage, user names, user contact destinations, and the like. One items of these aspects are allocated to one set of inverter.

Figure 11B:
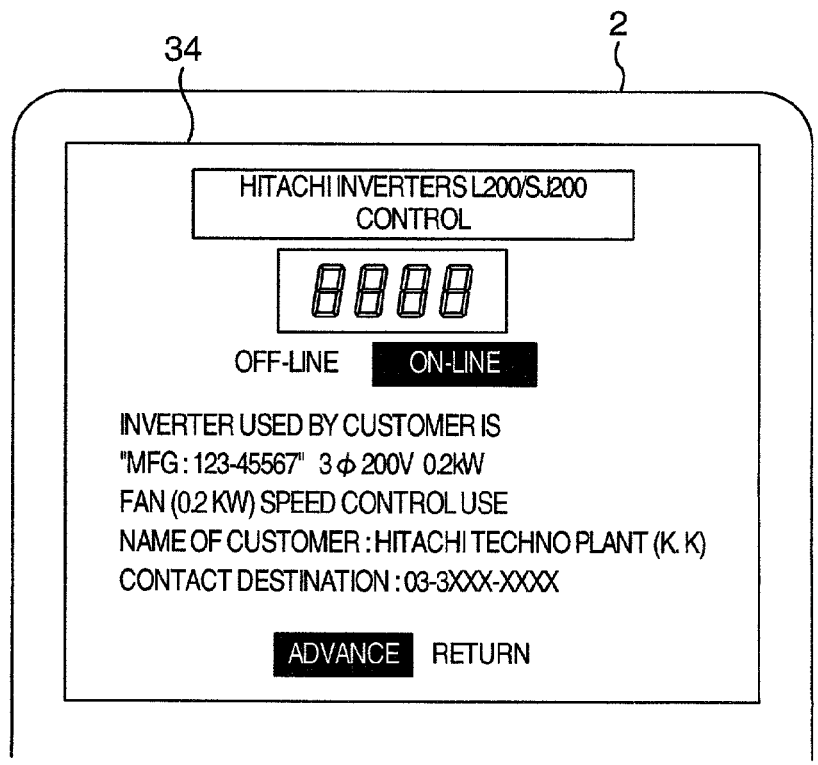

The user acquires the machine sort, the rated value, the contact destination, and the usage of the inverter 1 among these items into the portable telephone 2, and displays a display screen 34 of a failure recovery procedure (2) as indicated in FIG. 11(B).

In this case, as an initial condition, when the user purchases the inverter 1, this user performs the user registration. This user registration may be carried out by using the portable telephone 2. In other words, when the user purchases the inverter 1, the user accesses the site (Web server 6) of the inverter maker so as to download a program into the portable telephone 2, and thereafter, user enters a user name, a contact destination, and usage into the Web server 6.

In this case, when the portable telephone 2 is connected to the inverter 1, the portable telephone 2 reads out the serial number from the inverter 1. Thereafter, the portable telephone 2 transmits the data such as the user name, the contact destination, and the usage, which are entered by the user, to the user support server 3 (see FIG. 2).

Thus, the user support server 3 additionally writes the received information into the manufacture/sales historical information 22, and then stores the resultant information into the database (see FIG. 3).

Figure 4:
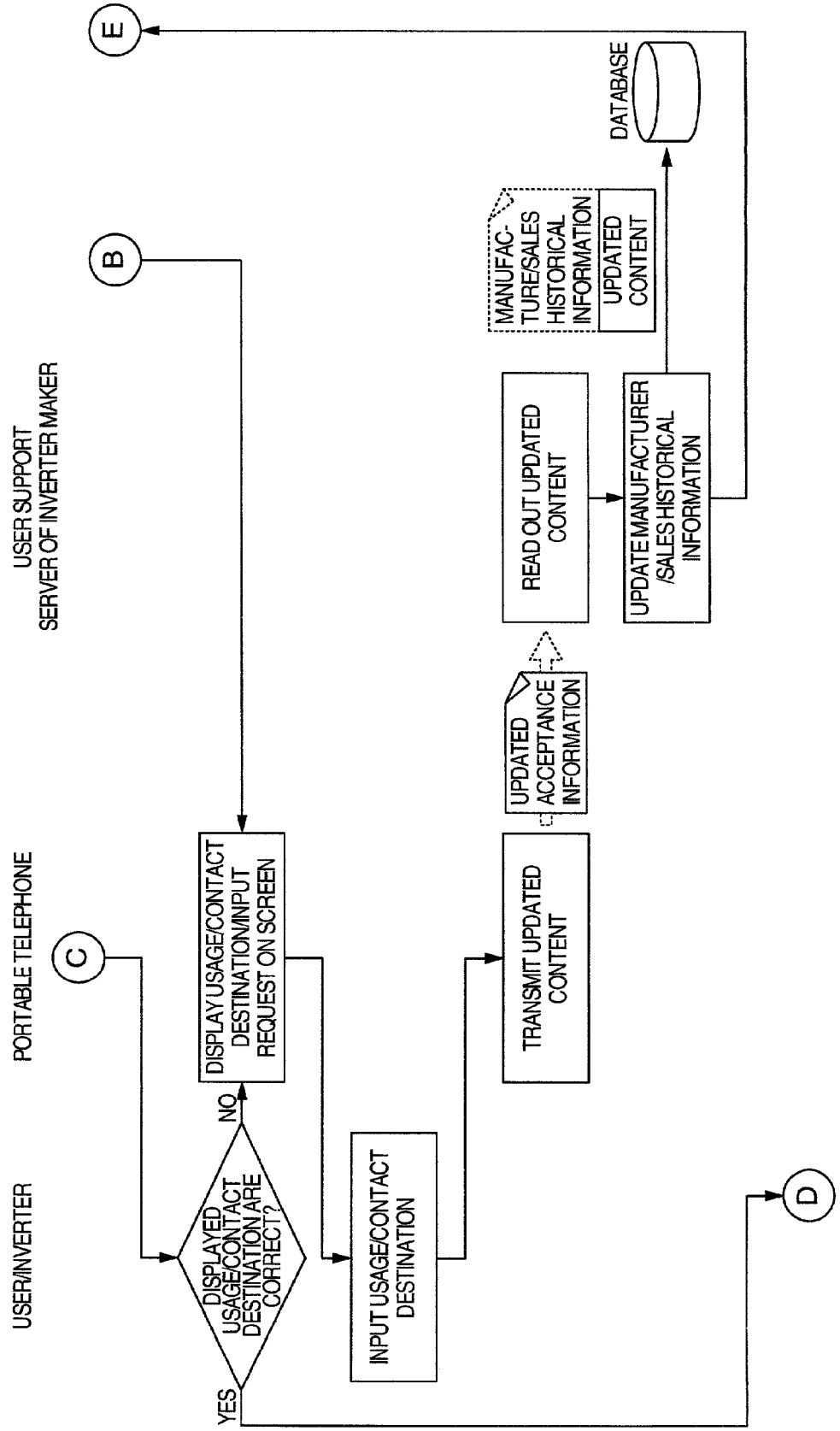
FIG. 4 is a third flow chart for explaining a process operation of the system according to one embodiment mode of the present invention.

On the other hand, in the case that such an access operation is issued from a user who has not yet been registered, in the case that an accessed content is changed from the originally registered content, and in the case that an inverter is supplied from an inverter maker where user registration is performed to an end user, namely, in such a case that a displayed content is different from the actual user information, the user corrects the information from the portable telephone 2 (see FIG. 3 and FIG. 4). Then, the corrected information is transmitted to the user support server 3, and is stored into the database 4 as the updated manufacture/sales historical information 22 (see FIG. 4).

Figure 5:
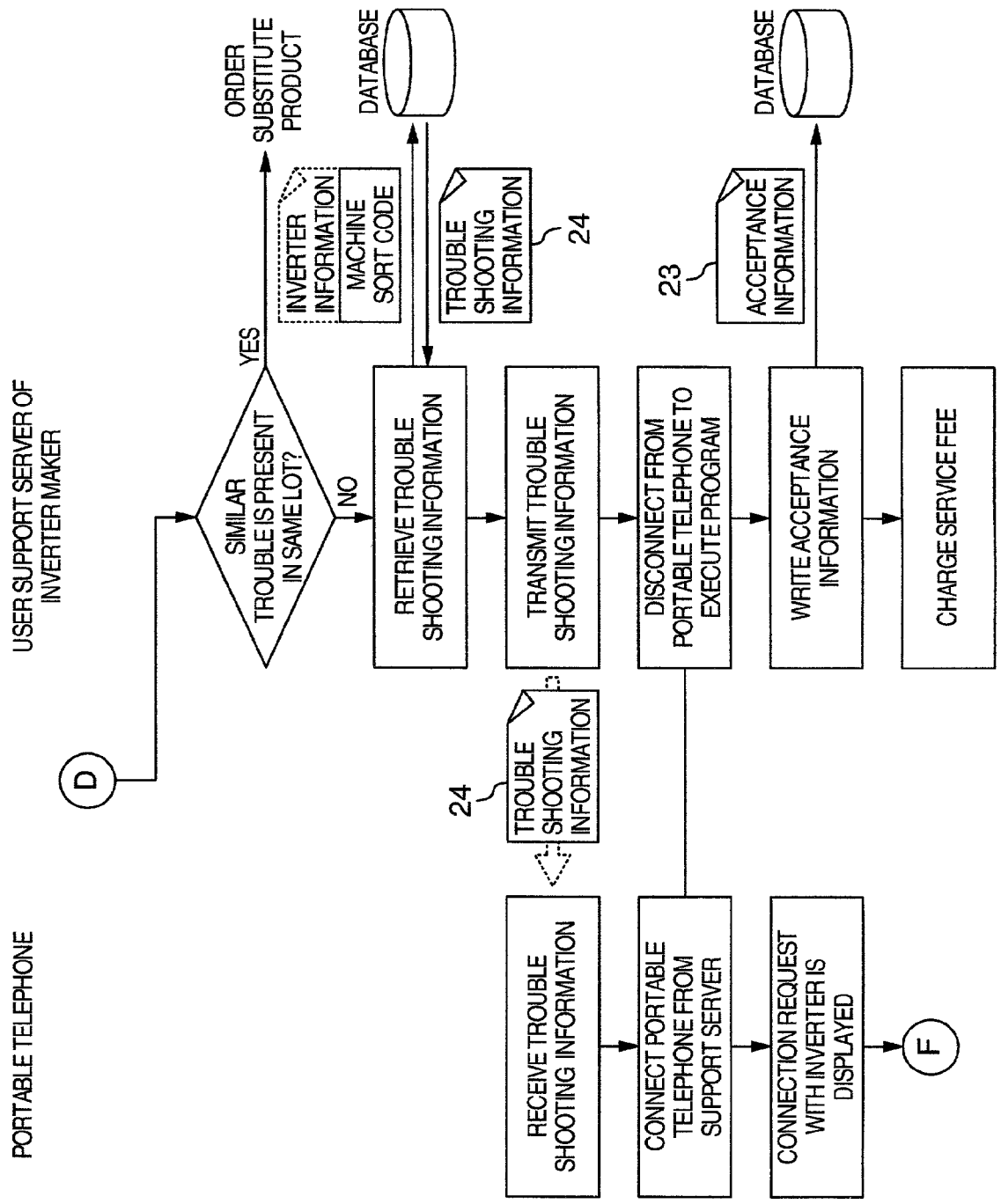
FIG. 5 is a fourth flow chart for explaining a process operation of the system according to one embodiment mode of the present invention.

Next, the user support server 3 analyzes a reason (cause) of a trouble based upon the machine sort code contained in the retrieved manufacture/sales historical information 22, and both the trip history and the operation history contained in the transmitted inverter information 21, and retrieves trouble shooting information 24 from the database 4, and then, transmits the retrieved trouble shooting information 24 to the portable telephone 2 (see FIG. 5).

As indicated in the above-described FIG. 10, the trouble shooting information 24 is constituted by the machine sort code, a conceivable inquiry/answer list, and a manual corresponding to this conceivable inquiry/answer list, to which trouble shooting file codes are allocated.

Then, the inverter information 21 obtained when the trouble shooting is accepted is combined with the transmitted trouble shooting file code, and an acceptance ID is applied to the combined information, so that acceptance information 23 is produced.

Figure 12A:
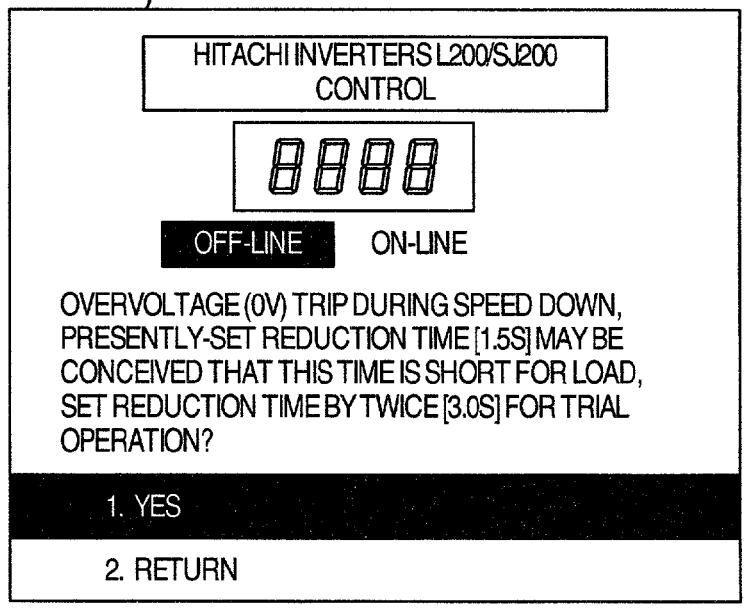
FIG. 12A and FIG. 12B are explanatory diagrams for explaining a display screen of an abnormal state recovering procedure in the system according to one embodiment mode of the present invention.
Figure 12B:
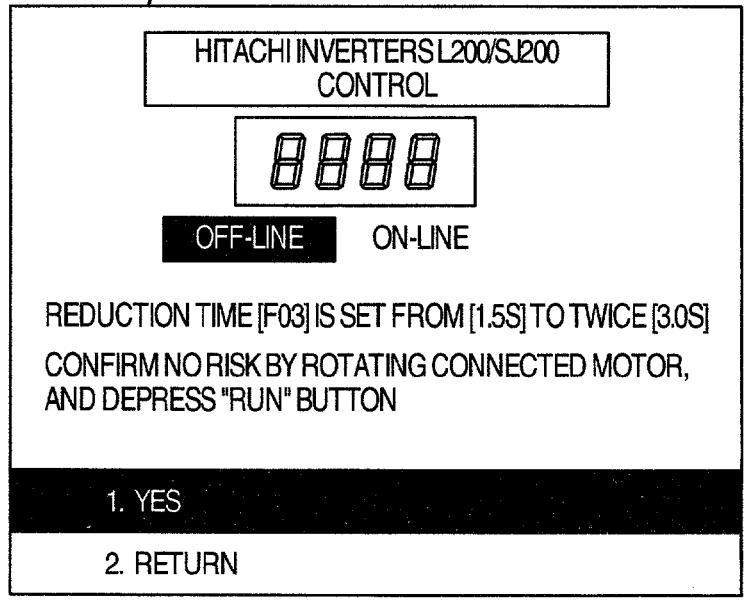

Since the portable telephone 2 which receives the trouble shooting file sequentially displays steps of recovery operations by way of both a display screen 35 of a failure recovery procedure (3) as indicated in FIG. 12A and a display screen 36 of a failure recovery procedure (4) as indicated in FIG. 12B, the user goes to the place where the inverter whose operation is stopped is installed, while this user takes the portable telephone 2 which has received the file in his hand. Then, if the user manipulates the inverter 1 in accordance with the procedures displayed on the screen of the portable telephone 2, then the user can perform the recovery work (see FIG. 6).

Also, at this time, while the user uses the allocated reception ID as a key, the user may be newly connected via the Internet from an information terminal such as either a portable telephone or a personal computer so as to download a manual corresponding to a failure content. Then, the user may output this downloaded manual on the display screen, or may print out this downloaded manual.

Both day/time and a content of the above-described support are stored into the database in the form made by additionally writing these day/time/service content into the acceptance information 23. A service fee is charged to the user, depending upon the service content.

Figure 6:
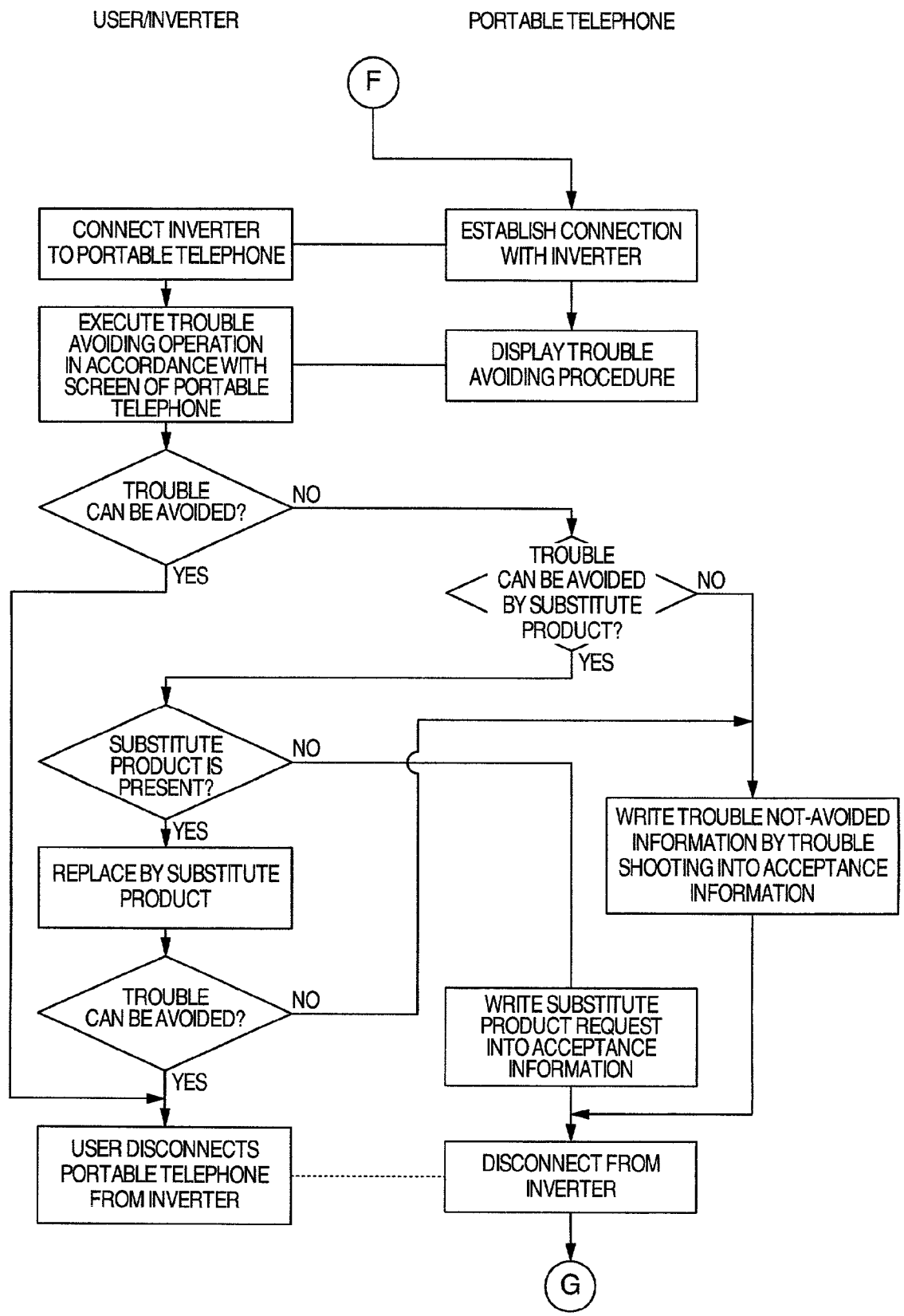
FIG. 6 is a fifth flow chart for explaining a process operation of the system according to one embodiment mode of the present invention.
Figure 7:
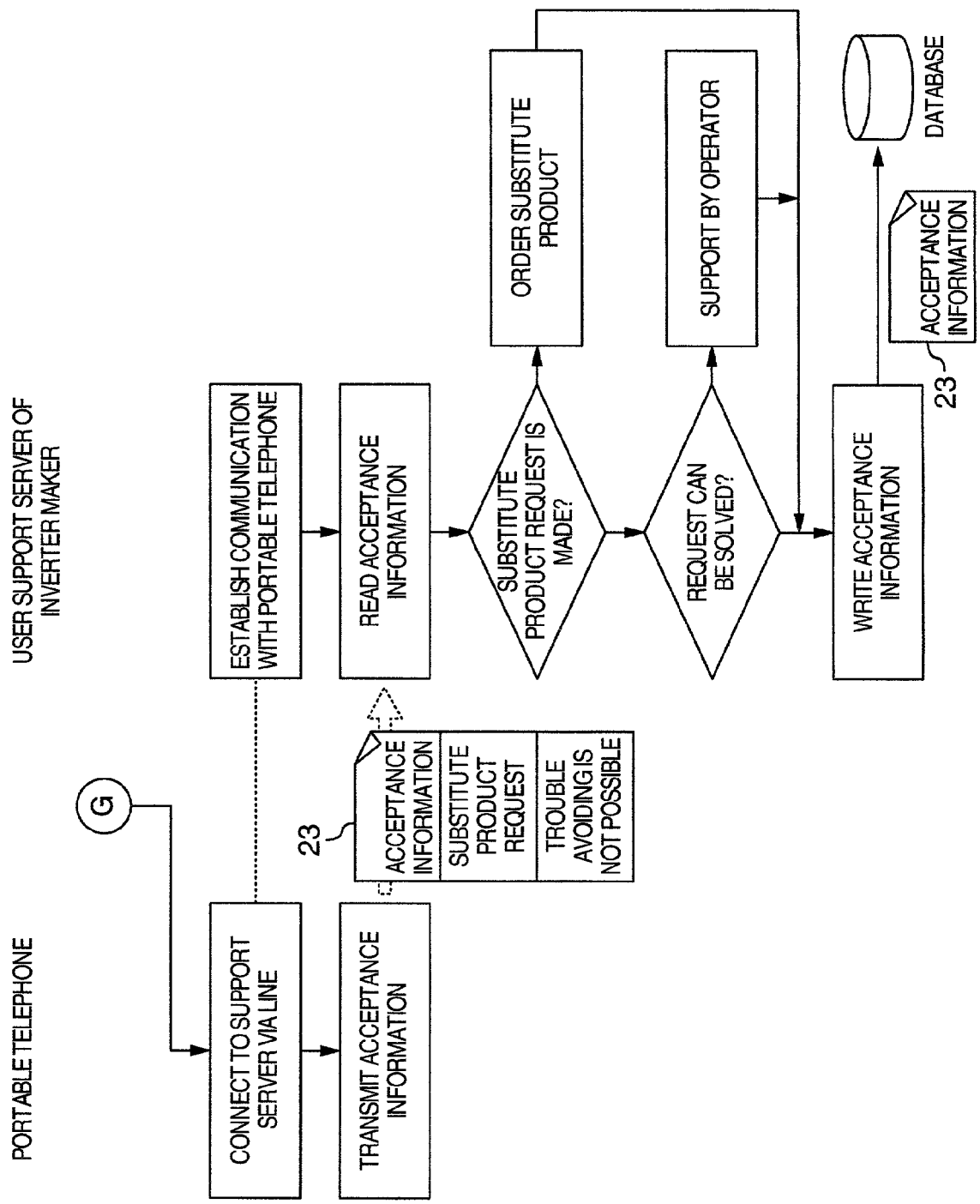
FIG. 7 is a sixth flow chart for explaining a process operation of the system according to one embodiment mode of the present invention.

On the other hand, in such a case that since the trouble of the inverter 1 cannot be recovered, the user selects a delivery of a substitute product, the portable telephone 2 is prompted to again disconnect the connection cable of the inverter and then, prompted to be connected via the telephone line to the user support server 6 (see FIG. 6 and FIG. 7).

Then, the transmitted acceptance information 23 is sent from the user support server to a delivery center 10 and a business branch/agent shop 11. As a result, a substitute product of the inverter is delivered.

At this time, since the setting parameter of the inverter during the malfunction, which is extracted from the inverter information, is contained in the reception information 23, the substitute product of the inverter may be delivered under such a condition that such a parameter of the inverter which has been used until the malfunction happens to occur is set by a service staff.

Also, in the case that the relevant machine sort of the inverter cannot be obtained due to ceased production and/or no stocked product, a substitute sort of this inverter is automatically set.

At this time, since the contact communication with both the delivery center 10 and the business branch/agent shop 11 is available for 24 hours without any staff, the system stop (interrupt) time of the user can be minimized.

The above description has been made of such a case that while the inverter 1 is installed at such a place where the portable telephone 2 cannot be communicated with the base station, the user support server 3 is not connected to the Internet. When the inverter 1 is installed at such a place that the portable telephone 2 can be communicated with the base station, immediately after the portable telephone 2 is connected to the inverter 1 so as to read out the inverter information 21, this portable telephone can send the read inverter information 21 to the user support server 3. In this case, such a cumbersome work may be omitted. This cumbersome work implies that once the connection cable is disconnected from the inverter, and thereafter, the inverter information 21 is transmitted from the place where the electromagnetic wave can be reached may be omitted.

It should be noted that the inverter information may be directly transmitted by way of the portable telephone line 5, or may be connected to the user support server 3, or via the Internet 7 to the user support server 3 at this time.

Also, the portable telephone 2 may be replaced by other portable type information terminals, for example, a personal computer having a communication function, and a PDA appliance.

Furthermore, the above-described explanation has been made of such a case that the inverter 1 is connected via the cable to the portable telephone 2. Alternatively, if a bidirectional communication is available, then any other communication systems may be employed. For instance, while a wireless communication function is provided with the inverter 1, this inverter 1 may be connected with the portable telephone 2 by way of such a mutual wireless appliance-to-appliance communication system as "Bluetooth (service trade name)." Alternatively, since a portable telephone built in an inverter itself may be connected to a portable telephone owned by a user via a server and a telephone line, the Internet connection may be utilized.

Also, in such a case that the inverter 1 is connected to an upper-grade controller and this upper-grade controller is connected to the Internet, an upper-grade electronic appliance may be communicated to the user support server 3. Further, while a communication function is built in the inverter 1, the upper-grade electronic appliance may be directly connected to the Internet by way of the Ethernet line and the like.

On the other hand, in the above-explained embodiment mode, the description is made of such a case that the user is charged every time the user receives the support service one time. Alternatively, while a support service contact made for a consideration is previously established between a user and a support service center, services may be provided within a predetermined time period. At this time, while a preselected number of charged points are previously applied to the user, such a total point may be reduced in response to a content of a service every time this service is provided.

The fact as to whether or not the support contact made for considerations is established, or the remaining service point may be written into the manufacture/sales historical information 22, alternatively, may be managed as the user information in a batch mode.

In this alternative case, as the user information, such a list may be made by employing a user name, a contact destination, and a serial number of an inverter purchased by this user.

On the other, the above-described services may provide such a merit that the agent shop/service providing company may easily execute the trouble shooting and may receive service orders. As a consequence, while the agent shop/service providing company are charged, the services may be freely provided with the user. Alternatively, charged fees may be involved in a communication fee by a communication firm, and then, the communication firm may collect a totalized communication fee.

Next, a description will now be made of a second embodiment mode of the present invention.

This second embodiment mode corresponds to such an embodiment mode that the present invention is applied to a service for such a user who intends to purchase an inverter.

Figure 13A:
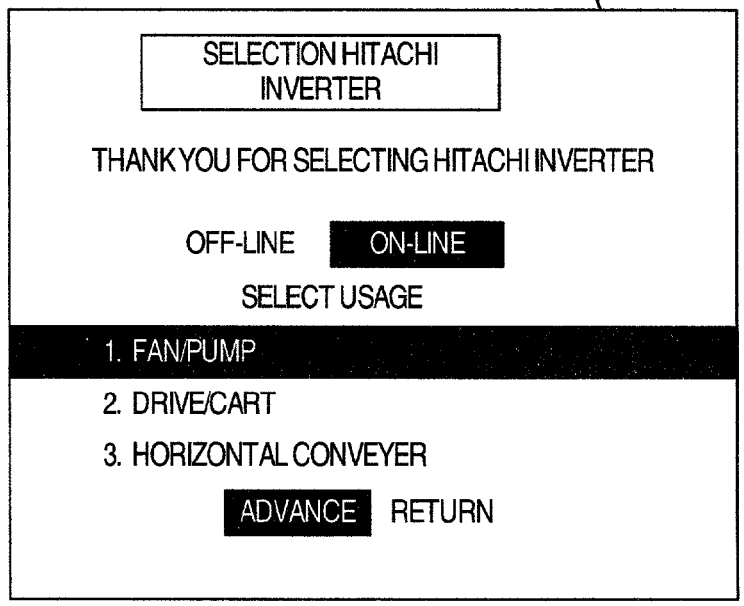
FIG. 13A and FIG. 13B are explanatory diagrams for explaining a display screen obtained while an inverter selection program is executed in the system according to one embodiment mode of the present invention.

A user who intends to buy an inverter accesses to the Web server 6 of the maker from the portable telephone 2 via the Internet communication 3 so as to download an inverter selection program. As a result, such an inverter selection screen 37 shown in FIG. 13A is displayed on the portable telephone 2 (see FIG. 3).

As a consequence, when the user selects from this screen 37 moment, present/absent of inertia, and necessary lifetime as to a load of an inverter, and also selects usage of this inverter, this selected data is transferred to the user support server 3 as inverter purchase desirable information.

Then, in the user support server 3, inverter recommendable machine sort information is formed based upon this inverter purchase desirable information, and then, is transferred to the portable telephone 2.

Figure 13B:
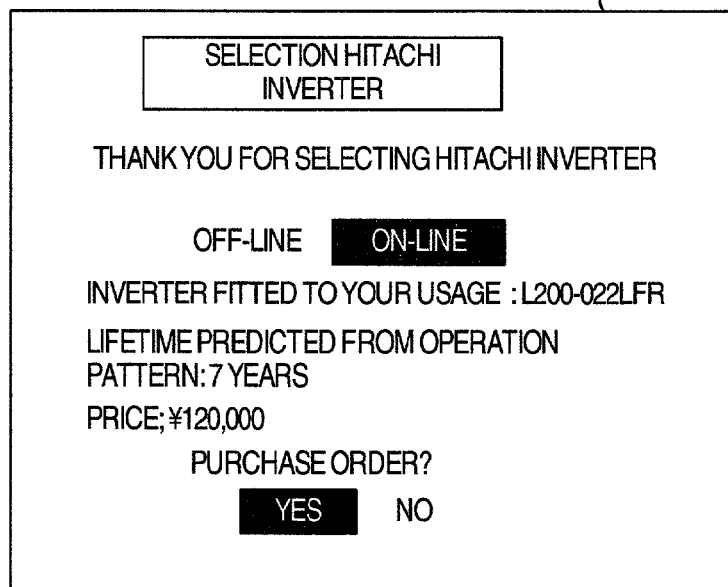

As a result, such an inverter recommendation screen 38 shown in FIG. 13B is displayed on the portable telephone 2, and represents a machine sort, a rated value, an estimated price of an inverter selected to this usage under optimum condition, and also setting of a parameter (see FIG. 4).

Then, when the user wants to purchase this represented inverter and inputs this inverter into the portable telephone 2, inverter machine sort determination information is transferred to the user support server 3. As a result, while a purchase acceptance ID is allocated to this inverter machine sort determination information, such a purchase acceptance information containing various data, e.g., usage/necessary torque/necessary lifetime is produced in combination with the user ID specific to the existing user, or a newly allocated ID for a new user. Then, this formed purchase acceptance information is transmitted to the delivery center 10 and the business branch/agent shop 11 (see FIG. 4).

The acceptance information is stored into the database (see FIG. 4), and this acceptance information is reflected on both the user information and the manufacture/sales historical information during, as previously explained, the user registration when the inverter is purchased. As a result, the user may save the input work load of the user information.

At this time, since the purchase acceptance information containing the parameter set determined when the user considers to purchase the inverter is transmitted to the delivery center 10, when the user wants to have the delivery, the delivery center 10 may deliver such an inverter into which the parameter has been previously set in connection with the usage.

At this time, furthermore, the user can receive the parameter from the user support server 3, while the acceptance number is used as the key. Since this portable telephone 2 is connected to the inverter 1 by the user, the parameter may be set to the inverter 1.

The above-explained embodiment has described such a user who considers to purchase a single set of inverter. Alternatively, with respect to such a user who considers to purchase an inverter in combination with a motor which should be driven by this inverter, or an electronic appliance such as a sequencer for controlling the inverter from an upper-grade appliance, both the inverter and the combined electronic appliance are supplied as a system. Parameters required to construct a system may be set by using a portable telephone. Alternatively, while a history about the inverter/ electronic appliance purchased as this system is recorded in a support server, trouble shooting/maintenance works as the system be carried out.

Next, a description will now be made of a service which is provided for a user who already purchased an inverter.

When a service man goes round to see a user, the service man prepares such a portable telephone 2 into which an inverter diagnostic program has been previously downloaded, and connects this portable telephone 2 to the inverter 1 so as to fetch inverter information containing an operation pattern of the inverter 1 into the portable telephone 2.

Then, when this inverter information is transmitted from the portable telephone 2 to the user support server 3, this user support server 3 identifies user information, while a serial number contained in the received inverter information is employed as a key, and then, may calculate a lifetime of the inverter based upon both a purchase term and an operation history.

For instance, the user support server 3 may calculate a lifetime of a smoothing capacitor employed in the inverter 1 based upon a load current history, and similarly, may calculate a power cycle endure amount of a power module from an operation pattern.

As a result, thus, the user can grasp such a timing that either a substitute product or a substitute part is required for an inverter.

Also, as a consequence, the user support server 3 can check as to whether or not the actual operation condition of the inverter 1 becomes severe, as compared with such a load and an operation pattern, which are supposed by the user when the inverter is purchased. As a result of this check, the user support server 3 can instruct the service man that this service man may recommend the user to buy an inverter having a up-graded rated value.

In addition, the user support server 3 may also predict a lifetime of a motor corresponding to the load of this inverter 1 from the operation history of the inverter 1. Similar to an inverter, as to a motor used by the user, the user support server 3 may propose such a timing for preparing a substitute product, namely may improve a sales effect.

At this time, the operation history of the inverter is transmitted to the user support server 3 at the same time when, for example, the user accesses to the user support server 3 due to some trouble in this embodiment mode, while this operation history of the inverter is involved in the inverter information. As a consequence, even if the service man does not actually go round to see the user, a similar business effect may be achieved which is obtained by that the service man actually goes round to see the user by merely connecting the portable telephone to the inverter by the user.

Also, in such a case that a certain change such as a version-up request will occur in a control program written into an inverter, a user connects a portable telephone to a server so as to download a control program, and then, connects the portable telephone to the inverter, so that the downloaded control program may be written into this inverter. If version-up information of the control programs is managed as internal information of inverters by a server, then such users who require the version-up operations may be listed up.

Next, an explanation will now be made of a mode of an inverter having an interface with a portable telephone.

Figure 14A:
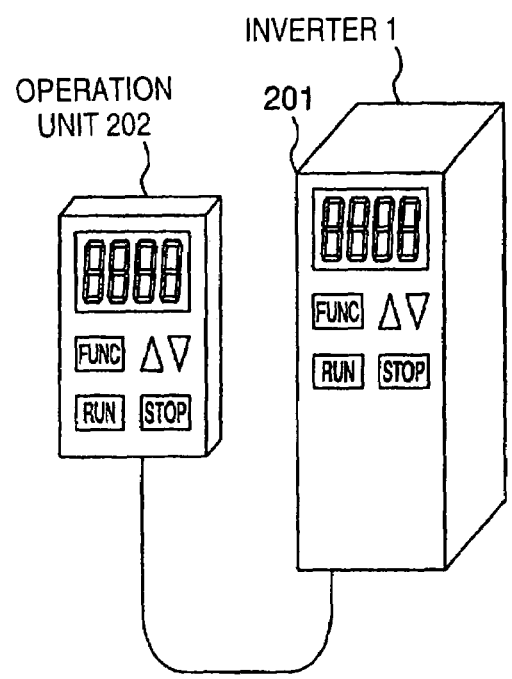
FIG. 14A and FIG. 14B are explanatory diagrams for explaining an inverter.

First, as illustrated in FIG. 14A, a conventional inverter is arranged as follows: That is, while another operation unit 202 is connected to a main body 201 of an inverter 1, both keys (push buttons) and a display unit are provided with both this main body 201 and the operation unit 202, as shown in this drawing. A control parameter may be entered and also inverter internal information may be read from these main body 201 and operation unit 202 in parallel.

On the other hand, in this embodiment mode, as previously explained, the portable telephone 2 which has downloaded the inverter control program may automatically enter the parameter received from the user support server 3 into the inverter. Furthermore, in accordance with this portable telephone 2, the parameter may be manually entered into the inverter 1 by employing the key and the display screen of this portable telephone 2.

Also, even in such a case that the operation of the inverter 1 is stopped due to abnormal condition, if the portable telephone is connected to this inverter, then an error code of this case may be displayed on the screen. Moreover, since this error code may be transmitted to the user support server 3, neither an input key, nor a display unit is not basically required in this inverter 1 in this embodiment mode.

As a consequence, in this embodiment mode, as to an inverter, it is merely possible to judge as to whether or not this inverter is operated under normal condition, or to judge as to whether or not the operation of this inverter is stopped due to abnormal condition. As a consequence, neither an input key, nor a display unit is required in the inverter 1.

Figure 14B:
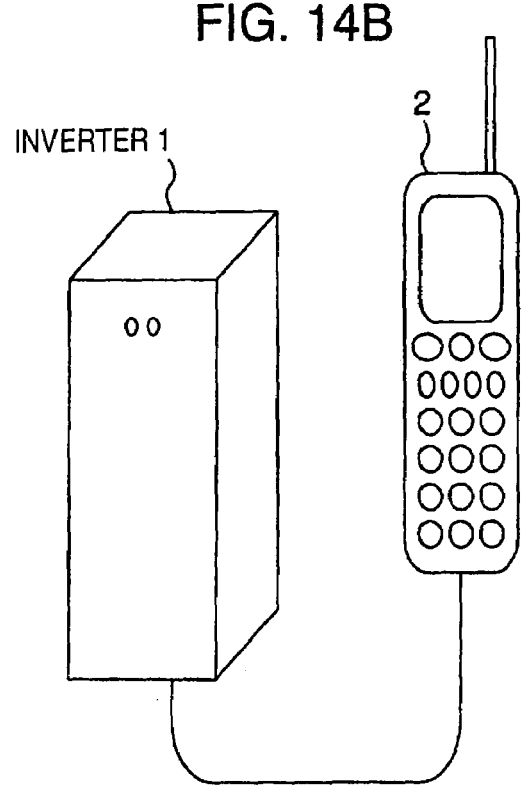

In other words, in this embodiment mode, in such an extreme case only two display lamps may be employed in this inverter 1, as indicated in FIG. 14B, while these display lamps merely indicate that the inverter 1 is operated under normal condition, or abnormal condition. Namely, for example, only two LEDs may be employed. As a consequence, in accordance with this embodiment mode, the inverter can be made more compact, so that this compact inverter may be built in the motor.

Figure 15:
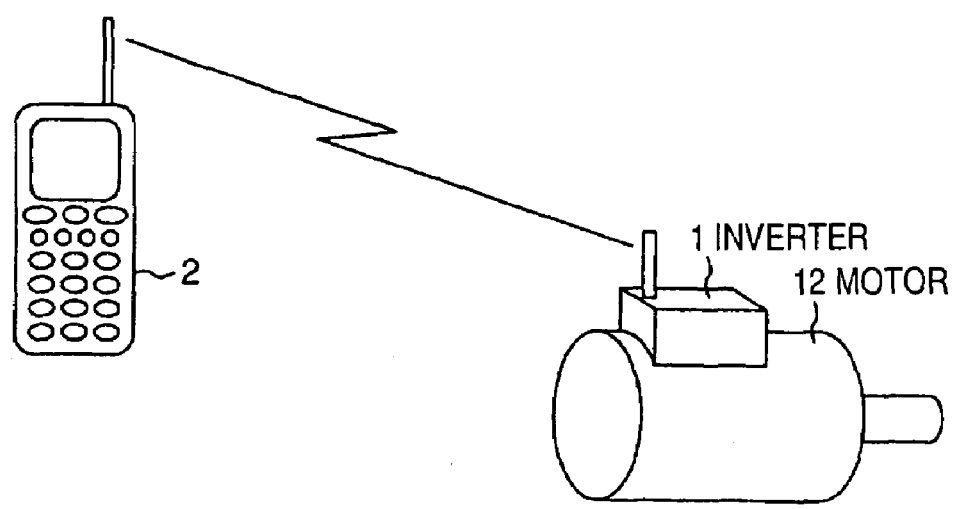
FIG. 15 is an explanatory diagram for explaining such an embodiment mode that the inverter is build in a motor.

FIG. 15 represents such an embodiment mode that the inverter 1 is built in a motor 12. In this case, while the inverter 1 itself has a portable telephone function, this inverter 1 may be connected via a telephone line to the portable telephone 2 owned by the user.

Also, since the portable telephone built in the inverter is connected to the server and the portable telephone owned by the user is connected the telephone line and the like, these portable telephones may be connected to each other via the Internet. In the case that the portable telephones are connected to each other via the telephone line and the Internet, there is such a merit that an operation condition of such an inverter installed at a remote place may be readily grasped.

Figure 16A:
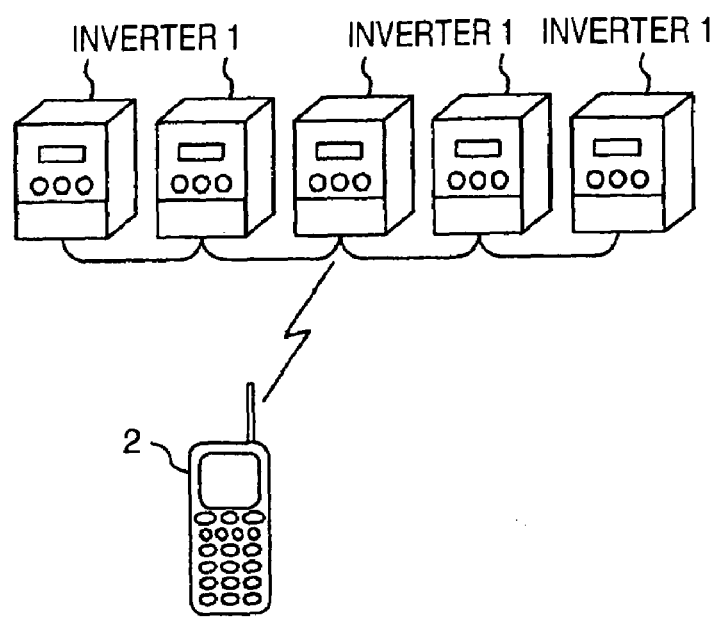
FIG. 16A and FIG. 16B are explanatory diagrams for explaining a connection mode between the inverter according to the present invention and a portable telephone.
Figure 16B:
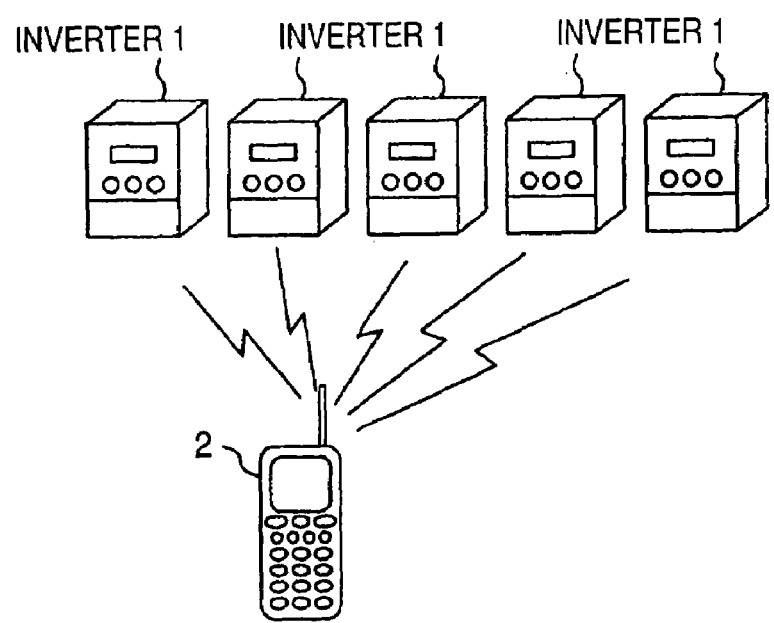

The above-described explanation has explained such a case that the inverter is communicated with the portable telephone in an one-to-one relationship. Alternatively, as indicated in FIG. 16A, one set of a portable telephone may be communicated with a large number of inverters. Since a plurality of inverters transmit/receive parameters to/from each other via one set of such a portable telephone, a wireless network may be established. Also, as indicted in FIG. 16B, while a network is formed by connecting inverters to each other by employing wiring lines, at least one set of these inverters may be communicated with a portable telephone, or may be communicated with an upper-grade electronic appliance via either a wiring line or a wireless line.

Also, while a network of inverters which are connected to the Internet by way of communication functions built in the respective inverters is connected to a portable telephone of a user via a server, the user may input/display a parameter by the own portable telephone connected to the Internet.

Also, while a motor is connected to an inverter by employing a signal line, such information as to a magnetic pole position of a motor, a primary current of the motor, a secondary current of the motor, a phase-to-phase voltage, a voltage of a neutral point, a temperature, and noise is transmitted via the invertor, so that this information may give advises for trouble shooting aspects of the motor. Alternatively, while the motor itself is provided with a communication function, the above-explained information may be directly sent to the portable telephone.

On the other hand, as to an elevator and an automobile, the below-mentioned method is known. That is, while a function as a portable telephone is built in an apparatus employed in these elevator and automobile, when a trouble happens to occur, the content of this trouble is automatically transmitted to a preset contact destination. This communication method may be applied to the present invention.

In this case, if the cost of such an apparatus having the portable telephone function is low, as compared with the cost of the invertor-main body, then the portable telephone functions may be separately contained in each of these inverters. Alternatively, a relay base station may be newly installed in the vicinity of the place where the inverters are set, if required.

In accordance with the present invention, the below-mentioned effects can be achieved.

1. Only when the user connects the inverter to the portable telephone, the inverter information which is acquired from the inverter and is transmitted from this inverter can be identified with the user information, the acceptance information, the manufacture information, and the trouble shooting information, which are saved in the database. Then, the inverter recovering method can be provided to the user.
2. Similarly, only when the acceptance information is notified to the agent shop, it is possible to quickly provide such a substitute product into which the parameter has previously been set. This parameter is identical to such a parameter of the inverter which has been used until malfunction happens to occur.
3. Only when the user downloads the inverter selection program into the portable telephone, and also the user merely inputs the usage, this user can grasp the necessary machine sorts and the necessary rated value of the inverter.
4. Similarly, since the content entered by the user is received, it is possible to previously set the required parameter to the inverter in correspondence with this usage entered by this user. Immediately operable inverters can be quickly provided to the users.

What is claimed is:

1. A method of performing maintenance of an inverter of a user using a portable telephone including a first interface for communication between said portable telephone and said inverter and a second interface for communication between said portable telephone and a user support server of a maker, comprising the steps of:

receiving abnormal information of said inverter from said inverter using said first interface of said portable telephone, when an abnormal condition has occurred in said inverter;

transmitting said abnormal information from said portable telephone to said user support server using said second interface;

at said user support server, analyzing said abnormal information so as to create trouble shooting information regarding said abnormal condition, and then transmitting said trouble shooting information to said portable telephone; and operating said inverter from said portable telephone, by using said first interface, based on said trouble shooting information so as to solve said abnormal condition of said inverter, without said portable telephone being in communication with the user support server through the second interface.

2. The method of performing maintenance of an inverter as claimed in claim 1, comprising a step of setting said first interface of said portable telephone by a program for connecting said portable telephone with said inverter.

3. The method of performing maintenance of an inverter as claimed in claim 2, wherein said step of setting comprises a step of downloading said program from a Web site of a maker to said portable telephone.

4. The method of performing maintenance of an inverter as claimed in claim 1, further comprising a step of entering a parameter from said portable telephone by manipulating a key thereof.

5. The method of performing maintenance of an inverter as claimed in claim 4, comprising a step of downloading a program for entering said parameter from said portable telephone into said inverter from a Web site of a maker to said portable telephone.

6. The method of performing maintenance of an inverter as claimed in claim 1, comprising, at said user support server, a step of adding an acceptance ID to internal information of said inverter at a time instant when said internal information is received by said user support server and storing said internal information with said acceptance ID into a data base.

7. The method of performing maintenance of an inverter as claimed in claim 1, wherein, when the abnormal condition of said inverter cannot be solved, as a result of automatic analysis by said user support server, said user support server is automatically connected to a support center operated by an operator.

8. The method of performing maintenance of an inverter as claimed in claim 1, comprising a step of, by said inverter, displaying an internal parameter of said inverter on said portable telephone.

9. The method of performing maintenance of an inverter as claimed in claim 1, wherein said inverter is built in a motor which is controlled by said inverter.

10. The method of performing maintenance of an inverter of a user as claimed in claim 1, wherein said inverter is arranged as one of a group of at least two inverters which are connected to each other via either a wire line or a wireless line.

11. The method of performing maintenance of an inverter as claimed in claim 1, comprising a step of rewriting a control program written into said inverter by downloading a program from a server of a maker by employing said portable telephone.

12. A method of performing maintenance of an inverter of a user using a portable telephone, where the inverter is in a location where telephone communications using the portable telephone cannot be established via a base station of the portable telephone, wherein a first interface is provided for communication between said portable telephone and said inverter and a second interface is provided for communication between said portable telephone and a user support server of a maker via the base station, comprising the steps of:
    connecting the portable telephone with the inverter and receiving abnormal information of said inverter from said inverter using said first interface of said portable telephone, when an abnormal condition has occurred in said inverter, without said portable telephone being in communication with the user support server via the base station through the second interface;
    disconnecting the portable telephone from the inverter, moving the portable telephone to a location where communication can be established to said user support server via the base station, and transmitting said abnormal information from said portable telephone to said user support server via the base station using said second interface;
    at said user support server, analyzing said abnormal information so as to create trouble shooting information regarding said abnormal condition, and then transmitting said trouble shooting information to said portable telephone via the base station, using the second interface; and
    re-connecting the portable telephone to the inverter and operating said inverter from said portable telephone, by using said first interface, based on said trouble shooting information so as to solve said abnormal condition of said inverter, without said portable telephone being in communication, via the base station, with the user support server through the second interface.

13. The method of performing maintenance of an inverter as claimed in claim 12, comprising a step of setting said first interface of said portable telephone by a program for connecting said portable telephone with said inverter.

14. The method of performing maintenance of an inverter as claimed in claim 13, wherein said step of setting comprises a step of downloading said program from a Web site of a maker to said portable telephone.

15. The method of performing maintenance of an inverter as claimed in claim 12, further comprising a step of entering a parameter from said portable telephone by manipulating a key thereof.

16. The method of performing maintenance of an inverter as claimed in claim 15, comprising a step of downloading a program for entering said parameter from said portable telephone into said inverter from a Web site of the maker to said portable telephone.

17. The method of performing maintenance of an inverter as claimed in claim 12, comprising, at said user support server, a step of adding an acceptance ID to internal information of said inverter at a time instant when said internal information is received by said user support server and storing said internal information with said acceptance ID into a data base.

18. The method of performing maintenance of an inverter as claimed in claim 12, wherein, when the abnormal condition of said inverter cannot be solved, as a result of automatic analysis by said user support server, said user support server is automatically connected to a support center operated by an operator.

19. The method of performing maintenance of an inverter as claimed in claim 12, comprising a step of, by said inverter, displaying an internal parameter of said inverter on said portable telephone.

20. The method of performing maintenance of an inverter as claimed in claim 12, wherein said inverter is built in a motor which is controlled by said inverter.

21. The method of performing maintenance of an inverter of a user as claimed in claim 12, wherein said inverter is arranged as a group of at least two inverters which are connected to each other via either a wire line or a wireless line.

22. The method of performing maintenance of an inverter as claimed in claim 12, comprising a step of rewriting a control program written into said inverter by downloading a program from a server of a maker by employing said portable telephone.

* * * * *